United States Patent [19]

Phillips

[11] 4,413,864
[45] Nov. 8, 1983

[54] GAS BEARING

[75] Inventor: Edward H. Phillips, Middletown, Calif.

[73] Assignee: Optimetrix Corporation, Mountain View, Calif.

[21] Appl. No.: 288,680

[22] Filed: Jul. 31, 1981

[51] Int. Cl.³ .............................................. F16C 32/06
[52] U.S. Cl. ..................................... 308/5 R; 384/122
[58] Field of Search ................. 308/5 R, DIG. 1, 9, 308/170, 122, 160, 73

[56] References Cited

U.S. PATENT DOCUMENTS

| | | | |
|---|---|---|---|
| 2,884,282 | 4/1959 | Sixsmith | 308/9 |
| 3,049,383 | 8/1962 | Loch | 308/9 |
| 3,305,278 | 2/1967 | Cencel et al. | 308/9 |
| 3,602,557 | 8/1971 | Girot | 308/122 |
| 3,661,432 | 5/1972 | Aihara | 308/9 |
| 3,722,996 | 3/1973 | Fox | 308/9 |
| 4,114,959 | 9/1978 | Christ | 308/5 R |
| 4,320,926 | 3/1982 | Heinemann et al. | 308/170 |

FOREIGN PATENT DOCUMENTS 1436254  5/1976  United Kingdom.

*Primary Examiner*—Lenard A. Footland
*Attorney, Agent, or Firm*—Patrick J. Barrett; Roland I. Griffin

[57] ABSTRACT

A gas bearing is provided which has a spherically contoured pocket with a gas supply passage which opens in the center of the pocket. The gas bearing is coupled to the load and is supported by a stem and a ball joint through which the gas is supplied to the bearing. An additional passage allows gas to flow between the pocket and a closed chamber in the bearing.

18 Claims, 8 Drawing Figures

GAS BEARING

BACKGROUND OF THE INVENTION

1. Field of the Invention

The present invention relates to gas bearings, commonly known as air bearings, for use in high precision optical and mechanical equipment.

2. Description of the Prior Art

Gas bearings have long been used for translational movement. Such bearings are used, for example, in such high precision equipment as step and repeat cameras for making integrated circuit patterns and other optomechanical devices. U.S. Pat. No. 3,722,996 to Wayne L. Fox for an "Optical Pattern Generator or Repeating Projector or the Like" granted Mar. 27, 1973 shows prior art gas bearings used in a high precision optomechanical device.

An advantageous form for a gas bearing for translational movement comprises a body with a gas pocket in the form of a portion of a sphere in one surface of the bearing. A gas, usually air, is supplied to the pocket at a constant pressure through a passage in the body. The load on the bearing is supported above a smooth fixed bearing surface by the film of gas between the pocket and the bearing surface. Since there is no actual contact between the pocket and the bearing surface and the viscosity of most gases, including air, is quite low, gas bearings are almost frictionless. Such a gas bearing is shown and described in United Kingdom Pat. No. 1,436,254 for "Air Bearing Arrangements."

The extremely low friction of a gas bearing permits a movable element in a piece of equipment to be moved with great precision using very small forces. However, under some load conditions, the prior art gas bearing described above permits undesirable oscillation of the load. This oscillation of the load has been found to occur most commonly when the load is relatively tall, as compared with its width and depth, and includes a mass in the form of a tower-like structure that is relatively compliant. Mechanical shocks can cause such a structure to oscillate at a resonant frequency in the range of 40 and 50 Hz, and the prior art gas bearing does not provide sufficient damping for such oscillations. The prior art mass-bearing system acts like a feedback loop with insufficient phase margin at gain crossover.

SUMMARY OF THE INVENTION

In accordance with the preferred embodiment of the present invention, a gas bearing with a gas pocket shaped like a portion of a sphere (i.e., a concave bearing surface) is provided with a chamber connected to the gas pocket by a passageway. Gas is supplied to the pocket through a flow restricter in an opening near the center of the pocket. The chamber acts a capacitor connected to the pocket through a resistor in the form of the passageway between the chamber and the pocket. The effect of these two additional elements is to lower and shift the closed loop response of the mass-bearing system. The resistive element is chosen to provide critical damping at the natural resonant frequency of the system.

DESCRIPTION OF THE PREFERRED EMBODIMENT

Figure 1:
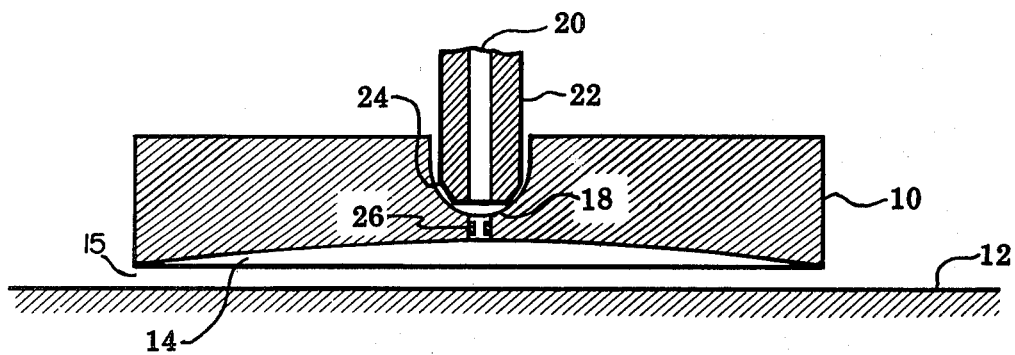
FIG. 1 shows a sectional view of a prior art gas bearing.

FIG. 1 shows a cross-sectional view of a prior art gas bearing 10. Bearing 10 rides above a fixed bearing surface 12 on a cushion of gas between fixed bearing surface 12 and a gas pocket 14. Gas pocket 14 is in the form of a portion of a spherical concave surface and is constantly supplied with gas at a constant pressure through passage 18. This passage is, in turn, supplied with gas through a passage 20 in a stem 22 to which the bearing is attached by a ball joint 24. A flow restricter 26 is placed in passage 18 to provide a restriction regulating the flow of gas to gas pocket 14 for the maintenance of the desired flying height of the bearing, shown as a gap 15 between fixed bearing surface 12 and the peripheral edge of gas pocket 14. Stem 22 is attached to the load (not shown) that is supported by bearing 10.

Figure 2:
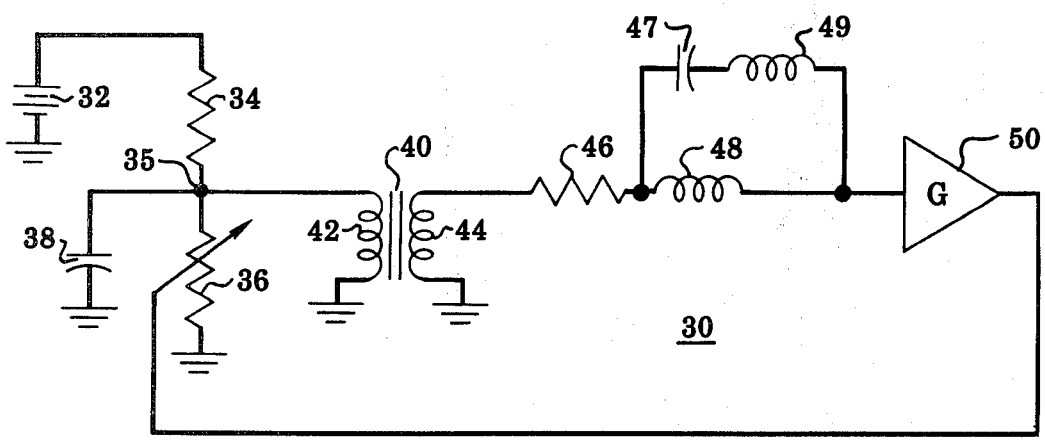
FIG. 2 is a schematic diagram of an equivalent electrical circuit for the prior art gas bearing of FIG. 1.

FIG. 2 shows an equivalent electrical circuit 30 that can be used to model or describe the operation of gas bearing 10. In this circuit, a battery 32 represents the pressure, $P_s$, of the gas supplied to the bearing via passage 20; a resistor 34 represents the pressure drop due mainly to flow restricter 26 between the supply and pocket 14; a variable resistor 36 represents the pressure drop due to the flying height or gap 15; the voltage at a node 35 between resistors 34 and 36 represents the pressure, $P_p$, in pocket 14; and a capacitor 38 represents the ratio of the volume of gas therein, V, to the pocket pressure, i.e., $V/P_p$. An ideal transformer 40, which operates at all frequencies down to D.C., has a primary winding 42 connected to node 35 and a secondary winding 44, where the primary to secondary winding ratio is proportional to the reciprocal of the area of the surface, A, of gas pocket 14. A resistor 46 connected to secondary winding 44 represents the squeeze film damping due to the gas film between fixed bearing surface 12 and gas pocket 14; an inductor 48 connected to resistor 46 represents the static mass supported by the bearing; a capacitor 47 represents the mechanical compliance of the structure supported by the bearing and an inductor 49 represents that portion of the supported mass that can vibrate due to the compliance of the structure. Feedback in the system is provided by an operational amplifier 50, having a gain G, which varies the resistance of resistor 36 (the gap) in response to any perturbations in the system.

Figure 3:
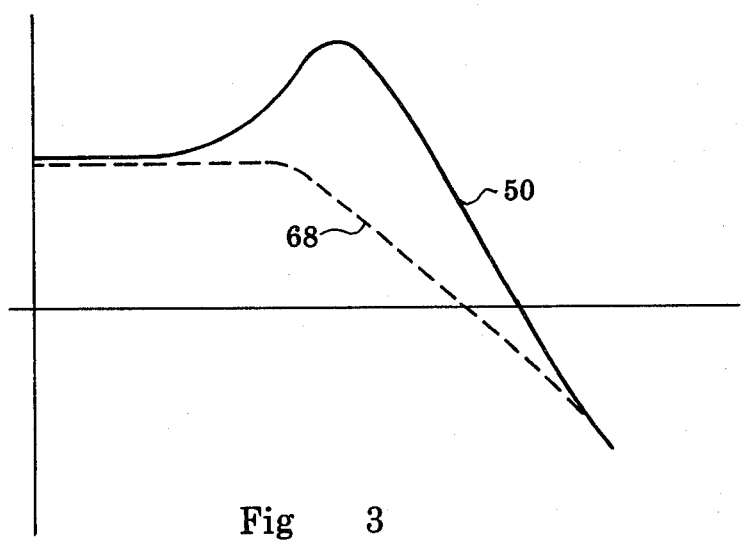
FIG. 3 is a graph of the frequency response of gas bearings.

Capacitors 38 and 47 together with inductors 48 and 49 form a resonant circuit. This circuit in conjunction with the feedback from amplifier 50 can become unstable and oscillate. This phenomenon is illustrated in the frequency response graph shown in FIG. 3. A solid line 50 represents the loop gain of prior art gas bearing 10 versus frequency. The gain has a high peak before it starts to roll-off, indicating the system is not well damped. As frequency increases, the gain rolls-off at 12 dB per octave due to the two poles in the resonant circuit formed by capacitors 38 and 47 and inductors 48 and 49. It has been found that this system has little or no phase margin at gain crossover, showing that it is at best marginally stable.

Figure 4:
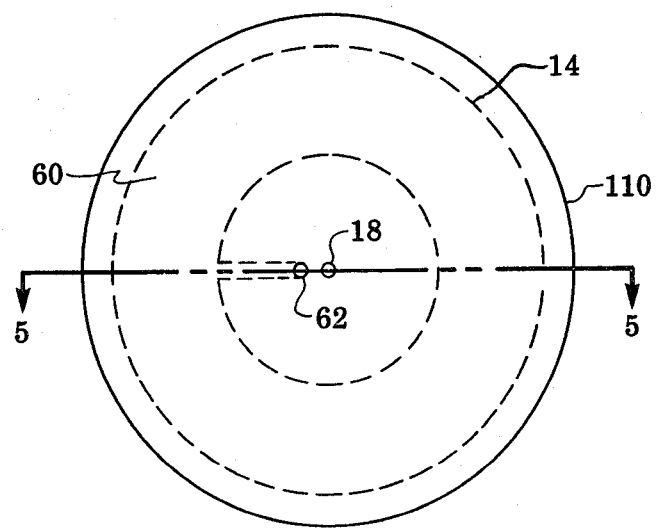
FIG. 4 shows a bottom view of the preferred embodiment of the present invention.
Figure 5:
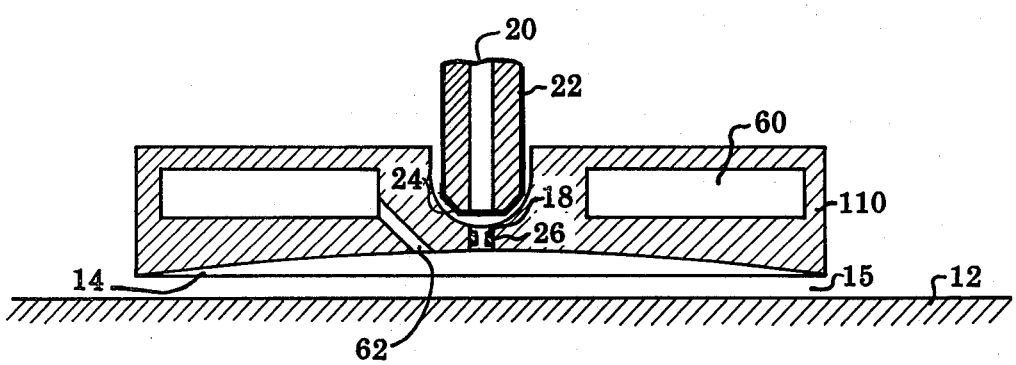
FIG. 5 shows a cross-sectional view of the device of FIG. 4.

FIG. 4 shows a gas bearing 110 built in accordance with the preferred embodiment of the present invention, and FIG. 5 shows a cross-sectional view of bearing 110. As with bearing 10, bearing 110 is attached to the load it supports by stem 22 in ball joint 24, and has a gas pocket 14 to which gas is supplied via passage 20 in stem 22. As in the prior art, gas pocket 14 is concave in shape although the curvature shown in FIG. 5 is very much exaggerated for the sake of illustration. In one example of the preferred embodiment the radius of curvature of gas pocket 14 is about 44 feet, whereas the diameter of bearing 110 is 1.3 inches. As in prior art bearing 10, passage 18 in bearing 110 includes a flow restricter 26 which may be 0.002 to 0.004 inch in diameter.

A chamber 60 in the body of gas bearing 110 is connected by a second passage 62 to gas pocket 14. As is explained in greater detail below, this chamber together with the flow restriction presented to gas moving in or out of the chamber damps the oscillations of the gas bearing supported mass. In the preferred embodiment, the diameter of passage 62 is about 0.020 inch, the volume of chamber 60 is about 0.1 cubic inch and the spacing between the openings of passages 18 and 62 into gas pocket 14 is about 0.1 inch.

Figure 6:
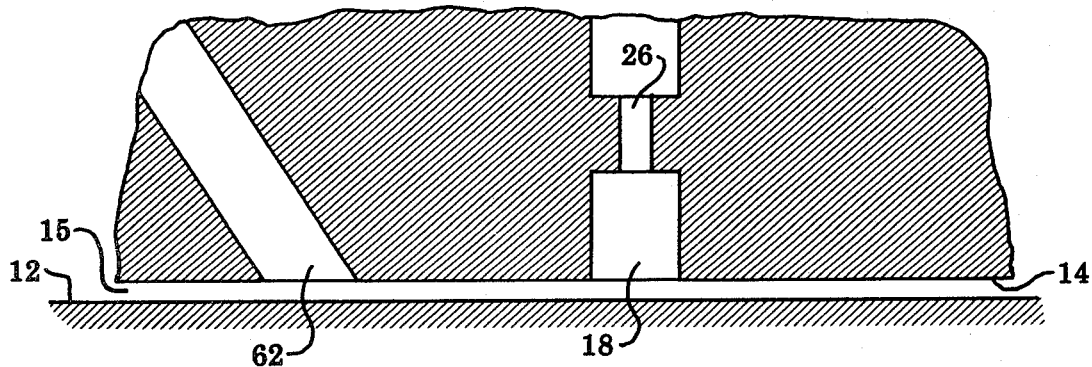
FIG. 6 is an enlarged view of a portion of FIG. 5.

The relationship of the openings of the two passages 18 and 62 to the height of the gas bearing above bearing surface 12 is shown in FIG. 6. The restriction to the flow of gas into and out of passage 62 is due mainly to gap 15, typically on the order of 0.0004 inch. This gap, coupled with the diameters of the openings of passages 62 and 18, defines a restrictive passage through which the gas must flow.

Figure 7:
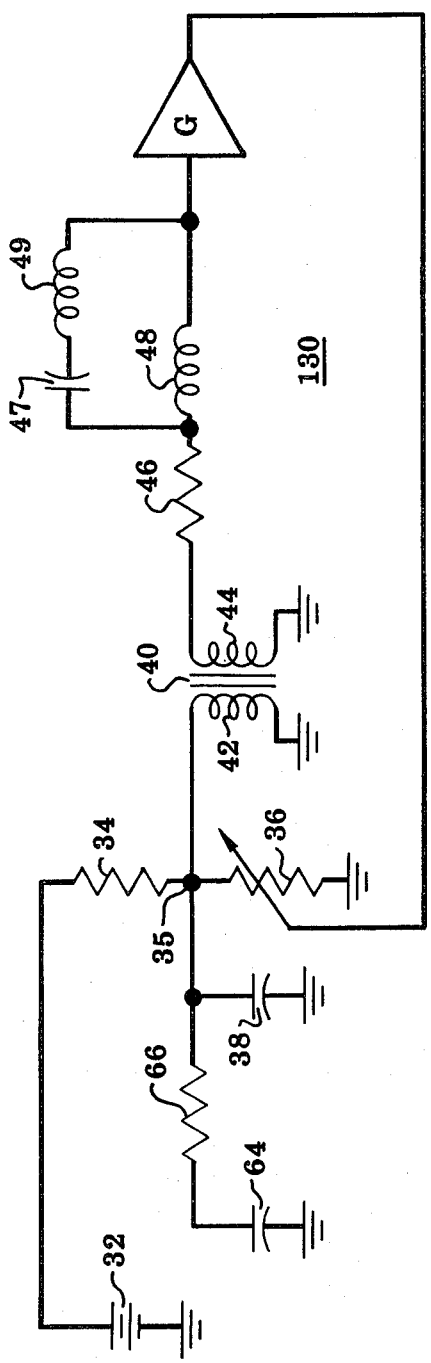
FIG. 7 is a schematic diagram of an equivalent electrical circuit for the preferred embodiment of the present invention.

FIG. 7 shows an equivalent electrical circuit 130 for bearing 110, where the components that are the same as the corresponding components in equivalent circuit 30 (FIG. 2) are designated with the same numbers. Added to the circuit are a capacitor 64 corresponding to chamber 60 and a resistor 66 corresponding to the restriction to the flow of gas into and out of passage 62. This resistor and capacitor split the two poles due to the capacitors 38 and 47 and inductors 48 and 49, significantly lowering the frequency of one of the poles. Thus the response begins to roll off at 6 dB per octave at a lower frequency than the prior art. Unity gain crossover occurs at a frequency lower than the frequency of the second pole. As is illustrated by a dashed line 68 in the frequency response graph of FIG. 3, the addition of capacitor 64 and resistor 66 improves the stability of the system. In particular, the peak in the frequency response curve is essentially eliminated, and at unity gain crossover the frequency response curve is rolling off somewhere between 6 dB per octave and 12 dB per octave. Thus, unity gain crossover occurs at a lower frequency with greatly improved phase margin.

The volume of chamber 60 is chosen so that its capacitive impedance at the resonant frequency of the supported structure is approximately the same as the inductive impedance at that frequency of the supported mass presented to the bearing. When the mass is considered as an inductor, the inductance is the mass divided by the square of the area of the supporting gas bearing surface. The inductive impedance, in turn, is the product of the inductance, the resonant frequency and $2\pi$, resulting in a mechanical impedance value having the units of lb sec/in$^5$. Similarly, when chamber 60 is considered as a capacitor, the capacitance is the volume of the chamber divided by the absolute pressure of the gas in the chamber. The capacitive impedance is the inverse of the product of the capacitance, the resonant frequency and $2\pi$. By choosing the capacitive impedance close to the inductive impedance described above and choosing the flow restriction in passage 62 as described below, the system will be made stable without undesirably degrading the closed loop frequency response. It is believed, for example, that adequate compenstion can be achieved if the capacitive impedance is less than two times the inductive impedance.

The flow restriction corresponding to resistor 66 is chosen so that the resistive impedance is as close as possible to the capacitive impedance. This means that the flow restriction is chosen for maximum energy loss at the resonant frequency. In a flow restricter comprising a cylindrical bore, as described below, the resistive impedance is equal to $128 \mu L/d^4 \pi$, where $\mu$ is the viscosity of the gas, L is the length of the bore and d is the bore diameter. It has been found that optimum results can be achieved through empirical selection of the optimum bore diameter once an approximate value has been determined in accordance with the foregoing.

Figure 8:
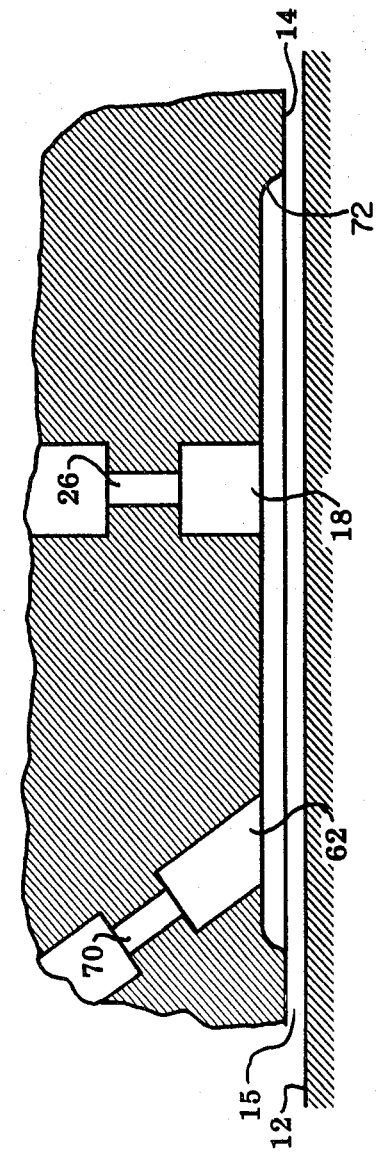
FIG. 8 is an enlarged view of a portion of an alternate embodiment of the device of FIG. 5.

An alternative way of providing the flow restriction corresponding to resistor 66 is shown in FIG. 8. Passage 62 is provided with a flow restricter 70, and an additional pocket 72 is provided in the central portion of gas pocket 14 to enable gas to flow more freely from passage 18 to passage 62. In this embodiment the resistance to air flow in and out of chamber 60 is mainly provided by flow restrictor 70. Typical dimensions for flow restricter 70 are about 0.007 inch diameter by 0.2 inch long.

In the design of gas bearings for precision equipment, gap 15 is usually selected to be much greater, e.g., an order of magnitude greater, than the surface irregularities on fixed bearing surface 12. The depth of gas pocket 14 should preferably be one times to 10 times gap 15 (the flying height). If the depth of gas pocket 14 is less than the flying height, satisfactory results are difficult or impossible to obtain. Thus, for example, if the flying height is selected to be 0.0001 inch, the depth of pocket 14 at the center of the bearing may be 0.0003 inch and the total gap at the center of the bearing would be 0.0004 inch.

The gas supply pressure, $P_s$, needed for a given bearing surface area depends upon the load to be supported by bearing 110 as well as the design parameters that determine the average pressure between gas pocket 14 and fixed bearing surface 12. The lower limit for $P_s$ for most practical applications is 10 psi, and the bearing usually operates with an average pressure between 0.20 $P_s$ and 0.70 $P_s$, although the preferred operating range is 0.25 $P_s$ to 0.45 $P_s$.

For optimum operation of bearing 110, the surface of gas pocket 14 should be extremely smooth, and the edge where the bearing surface meets the outer periphery of bearing 110 should be as sharp as possible. It is desirable to make the surface of gas pocket 14 matchable to a test plate to within two wavelengths of light, i.e., about 20 millionths of an inch or about 20 percent of the flying height. Such a surface contour and smoothness can be achieved using commonly known optical fabrication techniques.

While the preferred embodiment has been disclosed as having a bearing surface with a spherical contour, a bearing in accordance with the present invention could also be made with a conical or frusto-conical bearing surface. It is believed, however, that such a bearing would be more difficult to fabricate than the preferred embodiment.

I claim:

1. A gas bearing for supporting a load in a high precision apparatus having a fixed bearing surface, the gas bearing comprising:
 a gas inlet;
 a body having a concave pocket formed in a surface thereof opposed to the fixed bearing surface, said body having a circular periphery and having first and second openings in the pocket;
 a first passage through a portion of the body connected to the gas inlet and the first opening;
 first restrictive means for restricting the flow of gas through the first passage;
 an enclosed chamber in the body, said chamber being associated solely with said pocket;
 a second passage through a portion of the body connected to the chamber and the second opening;
 second restrictive means for restricting the flow of gas through the second passage; and
 mechanical coupling means for coupling the body to the load.

2. A gas bearing as in claim 1 wherein the first restrictive means includes a flow restricter included in the first passage.

3. A gas bearing as in claim 2 wherein the second restrictive means includes a flow restricter included in the second passage.

4. A gas bearing as in claim 3 wherein the contour of the pocket is spherical.

5. A gas bearing as in claim 4 wherein the mechanical coupling means comprises a stem mounted in a ball joint in the body, the gas inlet is a passage through the stem and the first passage in the body connects with the passage through the stem in the ball joint.

6. A gas bearing as in claim 2 wherein the contour of the pocket is spherical.

7. A gas bearing as in claim 6 wherein the mechanical coupling means comprises a stem mounted in a ball joint in the body, the gas inlet is a passage through the stem and the first passage in the body connects with the passage through the stem in the ball joint.

8. A gas bearing for supporting a load comprising:
 a source of gas;
 a flat fixed bearing surface;
 a body having a concave pocket formed in a surface thereof in a spaced facing relationship with the flat fixed bearing surface, the pocket having a circular periphery and a first and a second opening in the central portion of the surface;
 gas conduit means connected to the source of gas and the first opening for carrying gas from the source of gas to the first opening;
 first restrictive means for restricting the flow of gas through the gas conduit means;
 an enclosed chamber;
 a passage connecting the chamber to the second opening;
 second restrictive means for restricting the flow of gas through the passage; and
 mechanical coupling means for coupling the body to the load.

9. A gas bearing as in claim 8 wherein the first restrictive means includes a flow restricter included in the gas conduit means to restrict the flow of gas therethrough.

10. A gas bearing as in claim 9 wherein the second restrictive means includes a flow restricter included in the passage to restrict the flow of gas therethrough.

11. A gas bearing as in claim 10 wherein the contour of the concave bearing surface is spherical.

12. A gas bearing as in claim 11 further comprising an additional pocket formed in the first mentioned pocket and including the first and second openings.

13. A gas bearing as in claim 11 wherein the spacing between the flat fixed bearing surface and the pocket is no more than the depth of the pocket at the center thereof.

14. A gas bearing as in claim 13 wherein the mechanical coupling means comprises a stem mounted in a ball joint in the body and the gas conduit means includes a passage through the stem to the ball joint and a passage through the body from the ball joint to the first opening.

15. A gas bearing as in claim 9 wherein the contour of the concave bearing surface is spherical.

16. A gas bearing as in claim 15 further comprising an additional pocket formed in the first mentioned pocket and including the first and second openings.

17. A gas bearing as in claim 15 wherein the spacing between the flat fixed bearing surface and the pocket is no more than the depth of the pocket at the center thereof.

18. A gas bearing as in claim 17 wherein the mechanical coupling means comprises a stem mounted in a ball joint in the body and the gas conduit means includes a passage through the stem to the ball joint and a passage through the body from the ball joint to the first opening.

* * * * *